United States Patent [19]

De Jong

[11] 3,896,922

[45] July 29, 1975

[54] PROOFING BOX PLANT

[75] Inventor: Frank Cornelis De Jong, Dordrecht, Netherlands

[73] Assignee: Winkler-Den Boer, N.V., Dordrecht, Netherlands

[22] Filed: Dec. 3, 1973

[21] Appl. No.: 421,264

Related U.S. Application Data

[63] Continuation of Ser. No. 267,036, June 28, 1972, abandoned.

[30] Foreign Application Priority Data

July 29, 1971  Netherlands ...................... 7110470

[52] U.S. Cl. ............................................. 198/155
[51] Int. Cl. .......................................... B65g 15/28
[58] Field of Search .......... 198/146, 147, 155, 148, 198/158

[56] References Cited

UNITED STATES PATENTS

| | | | |
|---|---|---|---|
| 2,936,875 | 5/1960 | Von Kritter et al. ............... | 198/147 |
| 3,067,859 | 12/1962 | Jacobsen ............................. | 198/155 |
| 3,735,857 | 5/1973 | Aasted ................................ | 198/155 |

Primary Examiner—James B. Marbert
Attorney, Agent, or Firm—Cushman, Darby & Cushman

[57] ABSTRACT

A system for carrying dough products into, through and away from a proofing box includes a plurality of chain-mounted carrying plates which can be turned over during transport. A turn-over or reversing station includes rail sections and switch plates which engage and guide the plates so as to rotate them 180° relative to the chains as they pass through the station.

3 Claims, 4 Drawing Figures

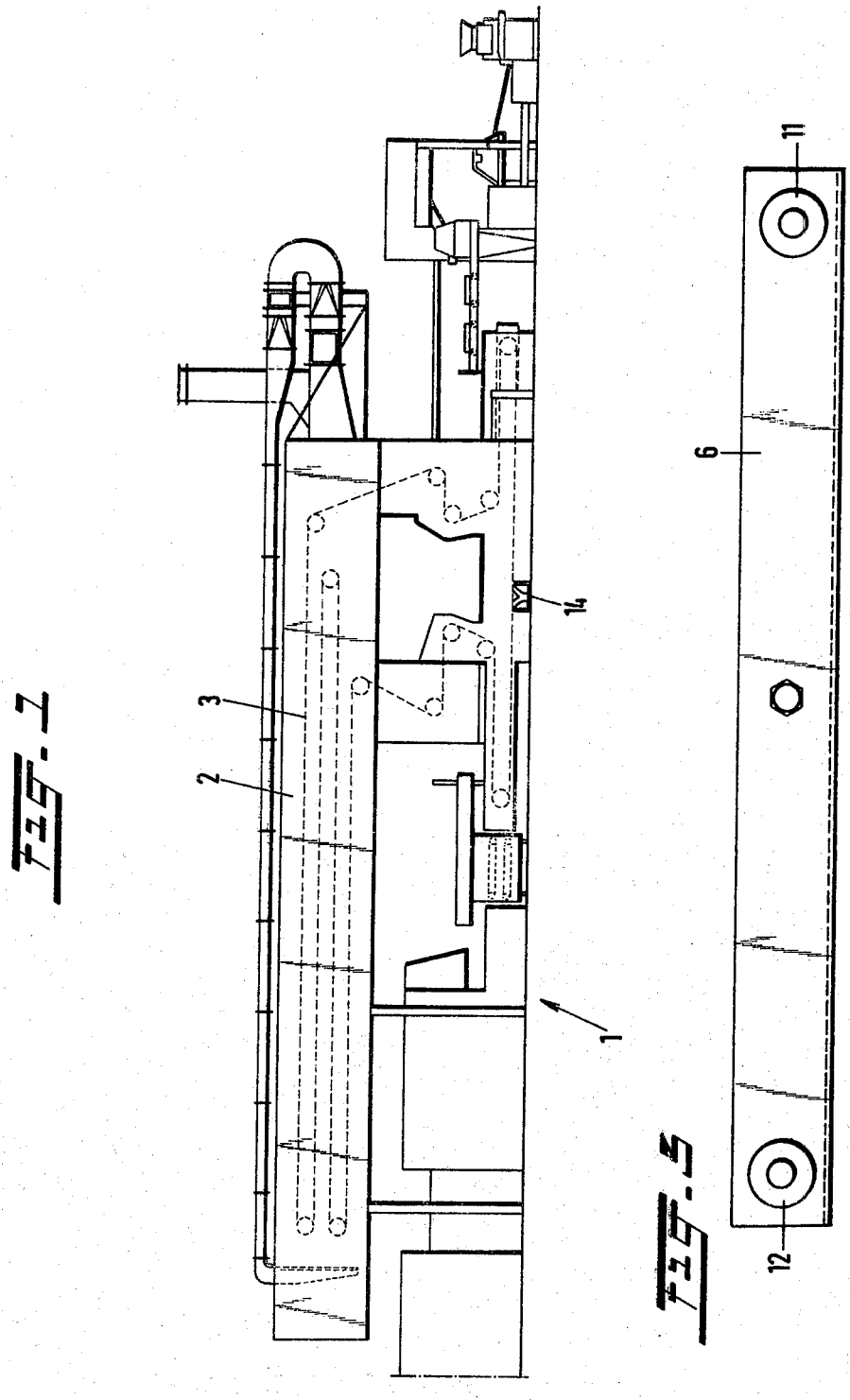

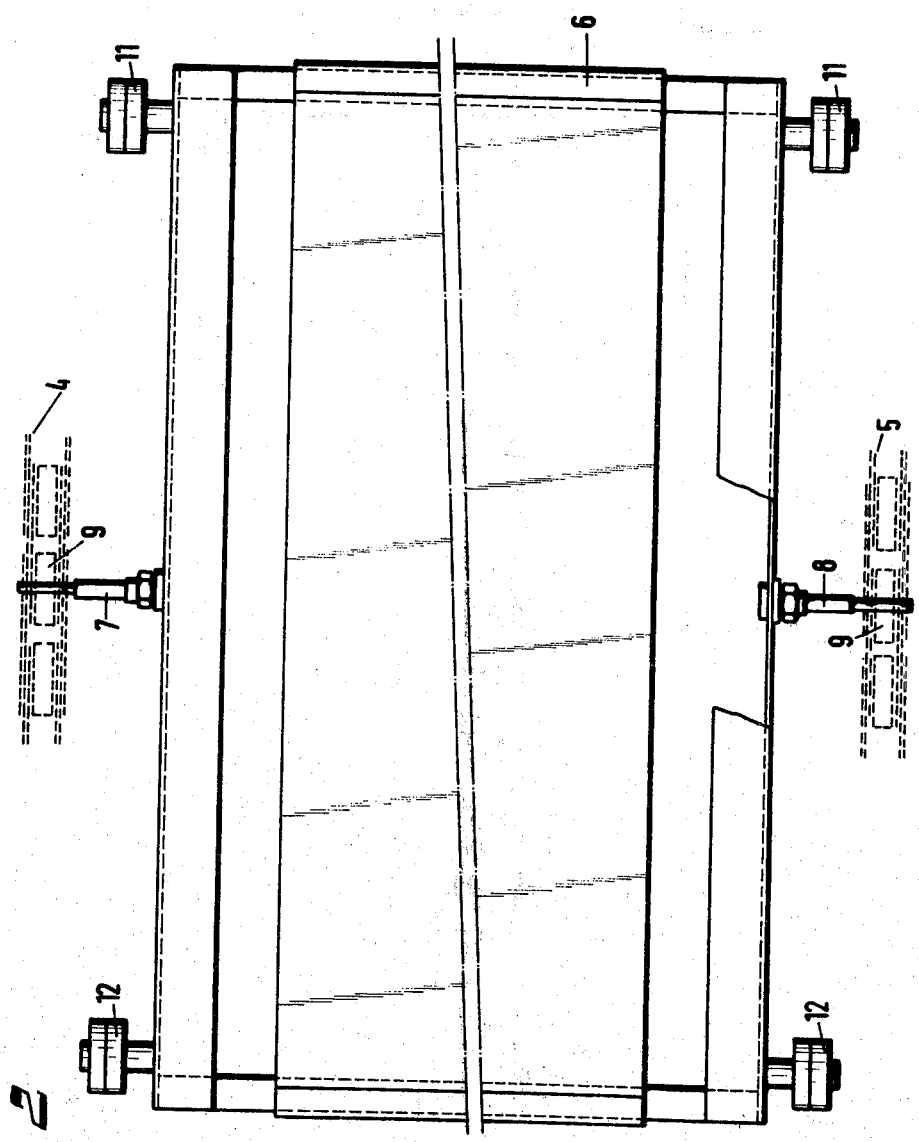

PROOFING BOX PLANT

This is a continuation, of application Ser. No. 267,036 filed June 28, 1972 and now abandoned.

This invention relates to a proofing box plant for raising dough products.

Generally known proofing box plants comprise a pair of parallel endless conveyor chains, carrying between them a plurality of carrying plates for carrying dough products to be treated for transport towards and away from the proofing box proper, each carrying plate being guided by a pair of parallel endless rails. These plants have the disadvantage that they cannot be used for both dough products in a mould and those directly placed on the carrying plates. The reason is that for dough products to be place directly on a carrying plate requires the surface of the plate to have releasing properties, or the products will stick to it during the proofing treatment. However, a non-stick surface is unsuitable for carrying moulds filled with a dough product, since this will result in contamination and damage which in turn renders it impossible to place dough products directly on it later on.

Indeed, in practice separate plants are used for proofing products placed directly on the carrying plates and for treating products in moulds.

It is an object of the present invention to provide a proofing box plant which is suitable for proofing dough products in both manners.

According to the invention, there is provided a proofing box plant for raising dough products, comprising appair of parallel endless conveyor chains carrying between them a plurality of carrying plates serving for carrying dough products to be treated for transport towards and away from the proofing box proper, each carrying plate being guided by a pair of parallel endless rails, characterized in that both of the major surfaces of each carrying plate are adapted to carry dough products, and each plate is suspended between the two chains for turning movement about its central axis transverse to the direction of transport, there being provided reversing means for turning each carrying plate during transport through 180° about its said central axis, so that its underlying surface comes in the upper position.

A carrying plate according to the invention is on one side provided with a non-stick surface, whereas the other surface need not be of a particular kind. The non-sticking surface may, for example, be aluminium sheet coated with a hard reflective outer layer of, for example, polytetrafluoroethylene (Teflon, a registered trademark).

The reversing means preferably comprise two leading and two trailing support members on each carrying plate, which support members are substantially equidistantly spaced from the central axis, and support the plate movably on the pair of rails, and a switch-operated pair of side rails deflecting from the pair of rails and returning to and into said pair of rails, which pair of side rails moves away from the pair of rails to a distance at least equal to half the distance of the two leading support members from the two trailing support members.

The reversing means are mounted in a portion of the conveyor belt formed by the pair of rails and the carrying plates, which can be rendered free from products being treated. When after the treatment of, for example, dough products in moulds it is desired immediately to process products directly placed on the carrying plates, which accordingly should be placed on the other, non-sticking surface of the plates, the switch of the pair of side rails is shifted at a moment when the leading support members of a carrying plate are approaching. These leading support members will then be forced by the movement of the conveyor chain to run into the deflecting rail sections, whereby they turn up the trailing part of the carrying plate with the trailing support members. The leading support members run from the deflecting rail sections into the return rail sections whereby the trailing part of the carrying plate is turned still further, and the trailing support members return to the pair of main rails in a leading position to the originally leading support members, which follow the former when running into the pair of main rails from the return rail sections. In order to ensure in a reliable manner that during the reversing or turn-over movement of the carrying plate the originally leading support members do not return into the deflecting rail sections which would block the plate, a double-faced pivoted switch plate is provided at the transition of the deflecting part of the side rails to the part returning to the main rails, which in the manner of a non-return valve prevents the return of the leading support members and also force them to follow the returning part of the side rails.

One embodiment of the invention will be described with reference to the accompanying drawings. In said drawings, FIG. 1 is a diagrammatic side-elevational view of a proofing box plant, provided with reversing means according to the invention;

FIG. 2 is a plan view, on a larger scale, of a carrying plate according to the invention;

FIG. 3 is a side view of the carrying plate shown in FIG. 2;

Figure 4:
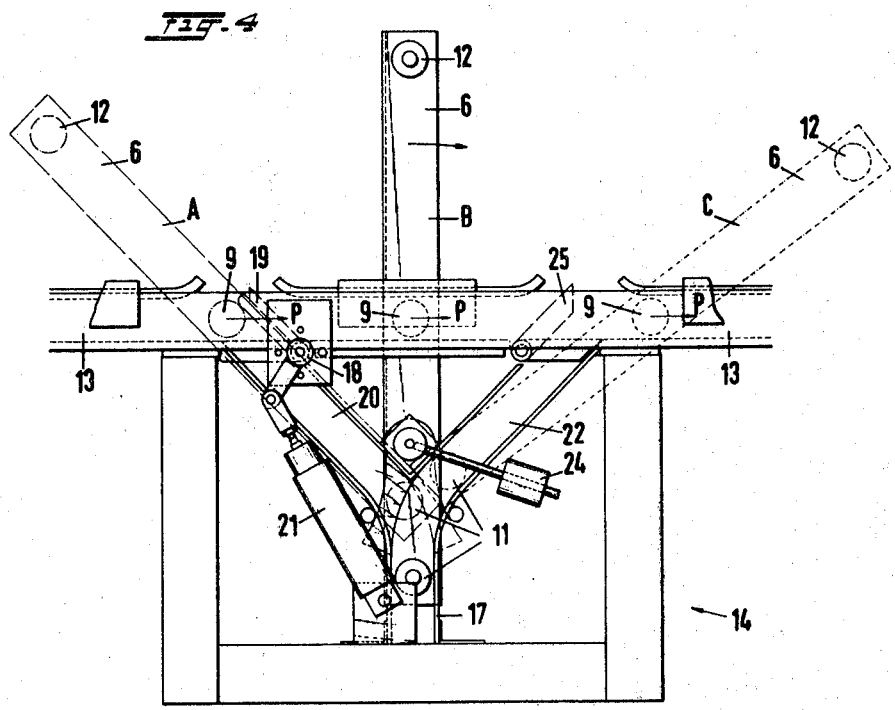
FIG. 4 is a diagrammatic side view, on a larger scale, of the reversing means according to the invention.

Referring to the drawings, the proofing box plant 1 comprises the actual proofing box portion 2, through which a conveyor 3 is passed several times back and forth to give the products being treated the desired residence time in the proofing box portion. According to the invention, the conveyor comprises a pair of parallel endless chains 4 and 5, between which a carrying plate 6 is suspended from trunnions 7 and 8, which trunnions are in alignment with each other, and the common axis of which coincides with the central axis of plate 6. Trunnions 7 and 8 are mounted for rotation in the conveyor chains, and at the point where they are secured there is provided a roller 9 guided in a rail (not shown) consisting for example, of a simple angle section.

Carrying plate 6 is provided with leading rollers 11 and trailing rollers 12 equidistantly spaced from trunnions 7, 8, and likewise guided in rails 13 (FIG. 4) consisting, for example, of steel sections.

In FIG. 4 the reversing means 14 (also see FIG. 1) are shown diagrammatically in a preferred embodiment. Rails 13 connect with a deflecting rail section 16, the lower end 17 of which is located substantially at 90° to the main rails 13. At the point of deflection of the pair of main rails, there is provided a switch 18 in the form of a hinged plate 19 constituting part of the bottom of rails 13, which switch can be operated by a hydraulic jack 21. The end 17 of the deflecting rail section 16 connects with a return rail section 22 returning to the main rails. A double-faced switch plate 23, having faces 23a and 23b, is located at the transition of deflecting section 16 and returning section 22 of the side rails, and is based toward a position in which it closes deflecting section 16 in one direction, by means of a weight 24. At the point where the returning section 22 joins the main rails there is provided a second hinged plate 25 normally urged into a horizontal position by gravity, in which portion the plate 25 constitutes the normal bottom of the main rails 13.

The operation of the reversing means according to the invention is as follows. When it is desired to reverse or turn over carrying plates 6 switch 18, is shifted to the dot-dash position, as a result of which the leading rollers 11 are forced into the deflecting rail section 16. Carrying plate 6 then comes to rest on the rollers 9 of conveyor chains 4, 5, turning about trunnions 7, 8, whereby trailing rollers 12 are lifted from rails 13 (position A). Subsequently the leading rollers 11 engage face 23a and thereby press open switch plate 23 and enter end rail section 17, which results in position B. The switch plate 23 then returns to its illustrated position under the action of the weight 24. As the conveyor (rollers 9) is moving further in the direction of arrows P, rollers 11 of the carrying plate, after passing switch plate 23, move upwards again, so that the rollers 11 engage face 23b and are forced to follow rail section track 22. During that movement trailing rollers 12 are gradually lowered on to rails 13, assuming a leading position relative to the initially leading rollers 11 relative to the vertical (position C). The carrying plate has thus been turned through 180°, and the lower surface has become the upper surface.

When all the plates have passed the reversing means, the switch is re-set, and the upper surfaces of the plates can be used.

I claim:

1. In a proofing box plate for raising dough products, a conveyor comprising two transversely spaced parallel endless conveyor chains, a plurality of carrying plates arranged in the space between the chains, pivot pins connecting each of the carrying plates to the chains and defining a tilting axis for the respective plate, a stationary guiding rail extending along at least one of said chains, forward and rear guiding elements disposed on said plates at opposite sides of said tilting axis and in a common level therewith to cooperate with said guiding rail for defining the angular position of said plates, said conveyor having a first and a second straight conveyor section and therebetween a tilting section to invert said plates when moving from said first to said second section, said tilting section comprising a recess in said guiding rail at said tilting section, a hinged plate mounted for swinging movement between a first position in which the plate occupies said recess and a second position in which the lower surface of the plate positively forces the forward guiding element of each carrying plate into the recess during travelling motion of the plates from the first section into said tilting section, said tilting section also comprising a deflecting rail having a first inclined portion extending downwardly from said hinged plate, said first portion joining with a second inclined portion extending upwardly to a second recess in said guiding rail and means at the location where said first and second inclined rail portions are joined for guiding said forward guiding element from said first portion into said second portion during movement of said chains.

2. A plant as in claim 1 wherein the guiding means at the junction of said first and second inclined rail portions includes a double-faced pivoted switch plate permitting passage of the forward guiding element in one direction only.

3. A plant as in claim 1 including a second hinged plate normally closing said second recess in said guiding rail, said second hinged plate being mounted for upward swinging movement when contacted by the forward guiding element of a carrying plate.

* * * * *